United States Patent Office 3,092,566
Patented June 4, 1963

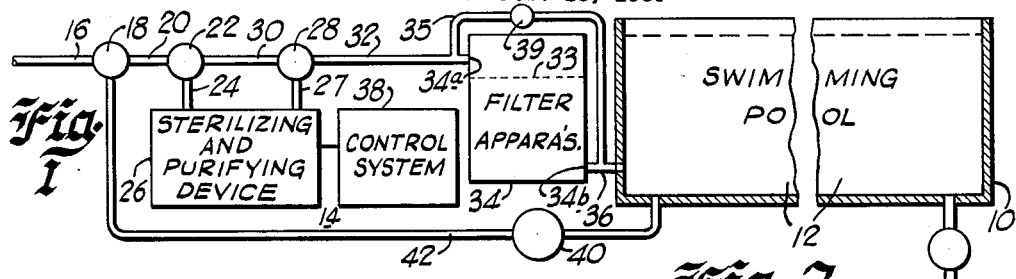
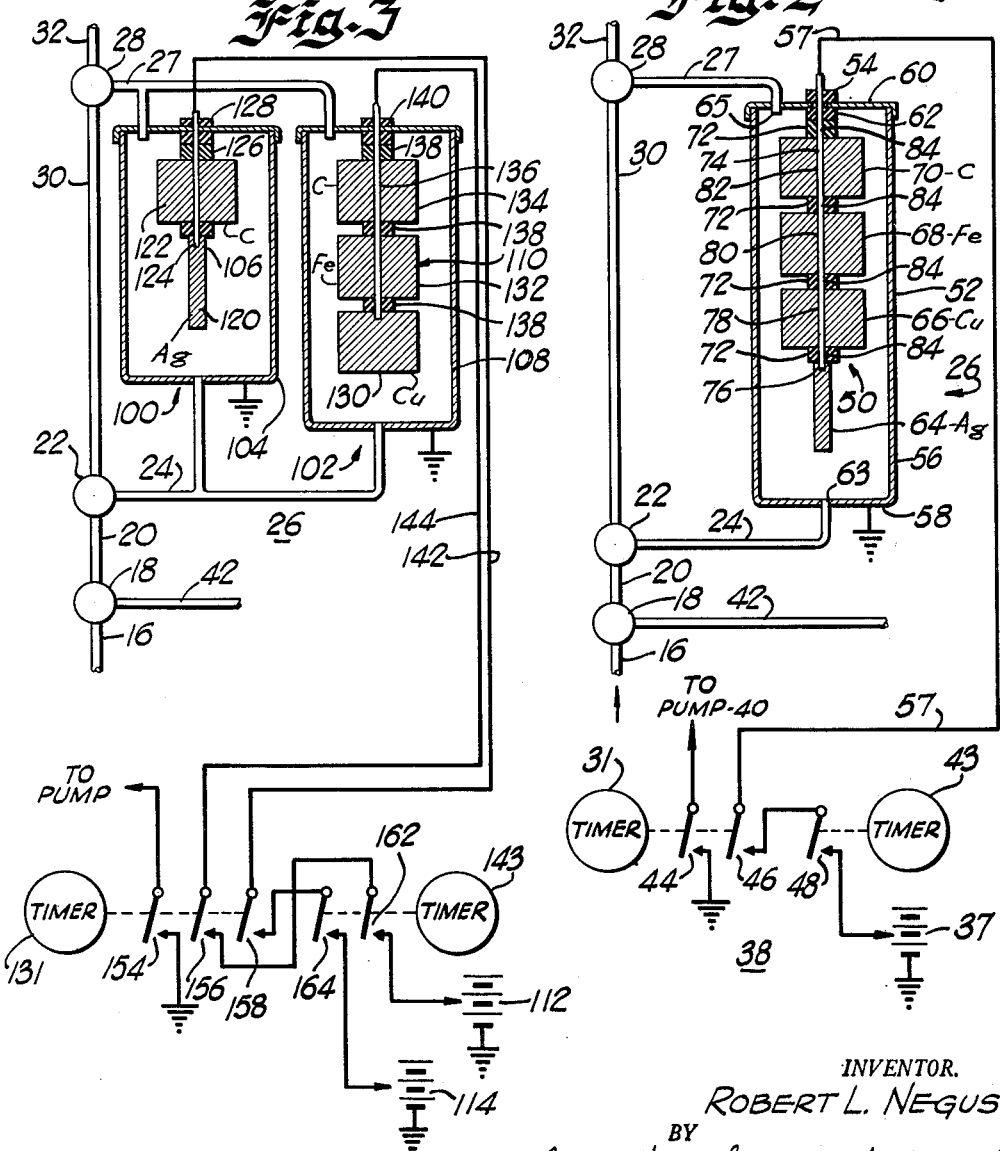

3,092,566
STERILIZATION AND PURIFICATION APPARATUS
Robert L. Negus, West Chicago, Ill., assignor, by mesne assignments, to Water Processing & Chemical Co., Limited
Filed Feb. 18, 1960, Ser. No. 9,531
3 Claims. (Cl. 204—240)

The present invention relates to water treatment apparatus and, more particularly, to apparatus for sterilizing and purifying water and the like.

It is an object of the present invention to provide a new and improved apparatus for simultaneously sterilizing and purifying water.

It is another object of the present invention to electrolytically sterilize and purify water.

It is yet another object of the present invention to electrolytically destroy pathogenic organisms and algae existing in water and, further, to remove non-organic particles, foreign bodies and the like from the water.

It is a further object in accordance with the previous object to produce a bacteria destroying product, an algae destroying product, and a product for cleansing non-organic particles from water.

It is yet a further object of the present invention to provide a compact and efficient sterilizing and purifying device for use in a water treatment system.

It is an object of the present invention to provide a sterilizing and purifying device adapted to be used in conjunction with filtration apparatus of a swimming pool or the like.

It is another object of the present invention in accordance with the previous object to introduce a certain percentage of the water treated by the device directly into the swimming pool or the like—without passing through the filtration apparatus.

It is a further object of the present invention to provide for a swimming pool or the like a water treatment system that functions periodically to recirculate water in the swimming pool through the system in order to reactivate the inactivated germicidal.

The above and other objects are realized in accordance with the present invention by providing a new and improved sterilizing and purifying device having particular utility with water treatment systems used with various installations requiring water and the like, for example, swimming pools. The water passes through the sterilizing and purifying device which operates to electrolytically produce a product for destroying bacteria, a product for destroying algae and the like, and a product for cleansing the water of its non-organic particles. The bacteria-destroying, algae-destroying, and cleansing products are dispersed in the water, and a part of the bacteria-destroying and algae-destroying products are fed directly into a swimming pool while the cleansing product is readily removed in a suitable filter apparatus associated with the inlet of the swimming pool. In accordance with one aspect of the invention, the water treatment system operates to recirculate the water in the swimming pool through the sterilizing and purifying device. In this connection, the device is periodically rendered operative and, in addition to producing the above-described products, the inactivated bacteria-destroying and algae-destroying products in the swimming pool are reactivated.

One embodiment of the sterilizing and purifying device comprises a single, compact electrolytic cell embodying a composite anode and a cathodic casing. The composite anode comprises a plurality of sections so dimensioned and physically related to one another that a predetermined amount and ratio of the above-identified products is electrolytically produced. Another embodiment of the sterilizing and purifying device comprises a double electrolytic cell, each of which includes a composite anode. In one cell the bacteria-destroying product is produced, while in the second cell the algae-destroying product and the cleansing product are produced. In order to obtain the desired ratio of these products, separate regulating devices are associated with the first and second cells.

The invention, both as to its organization and method of operation, taken with further objects and advantages thereof, will best be understood by reference to the following description taken in connection with the accompanying drawings, in which:

FIGURE 1 is a diagrammatic view of a water treatment system embodying the principles of the present invention;

FIGURE 2 is a diagrammatic view of one embodiment of a sterilizing and purifying device embodied in the system of FIG. 1; and FIGURE 3 is a diagrammatic view of another embodiment of the sterilizing and purifying device embodied in the system of FIG. 1.

Referring now to the drawing, there is illustrated in FIG. 1 one of many installations receiving or using water, for example, a swimming pool identified generally by reference numeral 10. The swimming pool 10 may be filled with water directly from a water main or may be filled with water that has passed through a water treatment system 14 which sterilizes and purifies the water. In either case, once the pool 10 is filled, the water treatment system 14 operates periodically to recirculate the water in the pool through the system 14 to maintain the water in the pool in a predetermined sterilized and purified condition.

Assuming that water passing through the system 14 is used to fill the pool 10, the flow of water is as follows: from a suitable supply, for example, a water main or the like (not shown), through an inlet pipe 16 past a manually operated valve 18, through a pipe 20 and a manually operated valve 22 which directs the water through a pipe 24 into a sterilizing and purifying device 26. The device 26 electrolytically disperses into the water a product that possesses bacteria-destroying properties, a product that possesses algae-destroying properties, and a product that removes or cleanses non-organic particles and the like from water. The water leaves the device 26 in a sterilized condition because of the presence of the bacteria-destroying and algae-destroying products and passes through an outlet pipe 27 to a valve 28 which directs the water into a conduit 32. The conduit 32 transports substantially all of the water into a filter apparatus 34 which contains a conventional filtration arrangement consisting, preferably, of filter screens 33 or beds of gravel and the like. However as shown, a conduit 35 by-passes the filter apparatus 34 and feeds a small amount of the water, containing the above products, directly into the pool 10 via conduit 36. Returning to the device 26, it will be appreciated that supply water can by-pass the device 26 by adjusting the valves 22 and 28 to cause the water to flow from the conduit 20 directly to the conduit 32 through a conduit 30.

Considering now the operation of the filter apparatus 34, the water enters the inlet 34a, passes downwardly through the screens 33 or beds of gravel, and flows out of the exit 34b. Since the product for cleansing the water of non-organic particles is insoluble in water, the cleansing product does not pass through the filter apparatus 34 but instead builds up on the upper filter screen 33 or bed thereby enhancing the filtering action of the apparatus 34. In addition, the bacteria-destroying and algae-destroying products impregnate the built-up cleansing product as well as the filter screens 33 or beds, with the result that the water is subjected to a concentrated sterilizing and purifying action in the filter apparatus 34 itself. In any event, water leaving the filter apparatus 34 is in a sterilized and purified condition, i.e., the water is tasteless, odorless, and colorless and, further, is substantially free of non-organic and/or solid particles. In the conduit 36, the sterilized and purified water leaving the filter apparatus 34 mixes with the sterilized water flowing out of the conduit 35. In order to control the relative amounts of water passing through the filter apparatus 34 and the by-pass conduit 35, a regulating valve 39 is located in the conduit 35. By this arrangement, a relatively small amount of bacteria-destroying product, algae-destroying product, and cleansing product pass directly into the swimming pool 10 without passing through the filter apparatus.

When the swimming pool 10 is filled, the manually-operable valve 18 is turned to an off position, thereby stopping the flow of water through the system 14 into the pool 12, and the control system 38 is energized to effect a periodic circulation of the water in the pool through the treatment system 14.

It will be appreciated that as the pool 10 is used, the amount of bacteria and the like increases, with the result that the bacteria count increases and the water in the pool 10 becomes somewhat contaminated. Accordingly, it is necessary that the contaminated water be withdrawn from the pool 10 and replaced with sterilized and purified water or, alternatively, that the contaminated water be resterilized and repurified. In this connection, the control system 38 causes the water 12 in the pool 10 to be periodically recirculated through the water treatment system 14 and, particularly, the sterilizing and purifying device 26. Specifically, the control system 38 embodies a timer mechanism 31 energized by a suitable voltage source, which mechanism 31 controls the on-off time of a pump 40 located in a conduit 42 interconnecting the swimming pool 10 with the valve 18 and controls the open-close time of a pair of contacts located in the energizing circuit of the device 26. The timer mechanism 31 is continuously energized by the voltage source and operates to periodically close suitable contacts 44 and 46 located respectively in the energizing circuits for the pump 40 and the device 26. The mechanism 31 is adjustable in the sense that the open and close time of the contacts 44 and 46 can be adjusted. For example, the mechanism may be set so that the pump 40 and device 26 are operative between 6:00 a.m. and 9:00 p.m. and are inoperative between 9:00 p.m. and 6:00 a.m. The control system 38 also includes a timer mechanism 43 for controlling the operation of the device 26 independently of the timer mechanism 31. To this end, the mechanism 43 operates a pair of contacts 48 serially connected with the contacts 46 in the circuit for the device 26 and may be set so that between 8:00 a.m. and 9:00 p.m. the device 26 is energized for one minute and is de-energized for eleven minutes, for example. In any event, with the valve 18 in a position to block the water from the supply system 14 and the pump 40 operative, the water in the conduit 42 is directed into the conduit 20 and, hence, the device 26, the water flowing through device 26 being sterilized when the device 26 is energized. By this arrangement, the water formerly in the pool 10 is resterilized in the device 26 and repurified in the filter apparatus 34.

Referring now in greater detail to the construction of the first embodiment of the sterilizing and purifying device, attention is directed to FIG. 2. As shown, the device 26 comprises an electrolytic cell having a composite anode 50 suspended axially within a generally cylindrical cathodic casing 52. The composite anode 50 is suitably insulated from the cathodic casing 52 by an insulating washer arrangement 54. In order to produce the necessary electrolytic action within the device or cell 26, the composite anode 50 extends upwardly through the cathodic casing 52 and is electrically connected by a conductor 57 to a variable terminal of a D.C. voltage source 37. To complete the electrical circuit, the cathodic casing 52 is suitably grounded, similar to the D.C. source 37.

The cathodic casing 52 is metallic and preferably is made from an iron alloy, for example chrome iron, and is of generally cylindrical, hollow configuration. Specifically, the casing 52 has a cylindrical wall 56 provided with a closed lower end 58 and a removable cover 60, suitably secured to the upper end of the wall 56. The lower end 58 and cover 60 are suitably apertured at 63 and 65 to accommodate the conduits 24 and 27, the aperture 63 in the lower end 58 being axially related to the cell while the aperture 65 in the cover 60 is offset in the cover 60 so that the composite anode 50 may be concentrically related to the cathodic casing 52. In this connection, an aperture 62 is defined axially of the cover 60 to accommodate the upper extension of the composite anode 50.

Considering now the construction of the composite anode 50 in greater detail, it includes a plurality of metallic sections 64, 66, 68 and 70 maintained in spaced apart relation by spacers 72. The metallic sections 64, 66, 68 and 70 and the spacers 72 are maintained in assembled relation to one another and to the cover 60 by an elongated metallic rod 74. In this connection, the lowermost section 64 includes a threaded recess 76 for accommodating the lower end of the rod 74 while the other sections 66, 68 and 70 include axially extending bores 78, 80 and 82, respectively, for accommodating the body of the rod 74. The spacers 72 likewise have axial bores 84 for receiving the rod 74. In assembly, the lower end of the threaded rod 74 is threaded into the recess 76 of section 64 and, thereafter, the spacer 72 is placed over the rod 74 and moved into engagement with the upper end of the metallic section 64. Thereafter, the metallic sections 66, 68 and 70 and the spacer 72 are alternately positioned on the rod 74. With the sections 64, 66, 68 and 70 and the spacer 72 in assembled position, the metallic rod 74, extending upwardly above the uppermost spacer 72, is inserted through the insulating washer arrangement 54 which, as shown, coacts with both the upper and lower surface of the cover 60. After the composite anode 50 is assembled to the cover 60, the cover 60 is suitably secured to the upper end of the casing 52. As shown, the extreme upper end of the metallic rod 74 extends slightly above the insulating washer arrangement 54 so that the conductor 57 can be conveniently secured to the rod 74. Thus, the D.C. voltage source 37 is electrically connected to the anode sections 64, 66, 68 and 70 via the rod 74.

In a sterilizing and purifying cell built in accordance with the principles of the present invention, the cathodic casing 52 is constructed of chrome iron and has a length of approximately eleven and one-half inches and a diameter of approximately four inches. The composite anode 50 comprises the following metallic sections: section 64—silver, section 66—copper, section 68—iron, and section 70—carbon. The silver section 64 has a length of approximately three inches and a diameter of approximately one-half inch, while the copper, iron and carbon sections 66, 68 and 70 have a length of two inches and a diameter of two and one-half inches. Accordingly, the cylindrical wall of the silver section 64 is spaced one and one-half inches from the cylindrical wall of the cathodic casing 52 and the cylindrical walls of the sections 66, 68, and 70 are spaced three-quarters of an inch from the cylindrical wall of the cathodic casing 52. The spacers 72 are a half-inch in length so that the silver, copper, iron and carbon sections 64, 66, 68 and 70 are spaced vertically apart by approximately a half-inch. Since the wall of the silver section 64 is spaced one and one-half inches from the casing wall, the rod 74 is so located relative to the cover 60 that the lower end of the silver section 64 is spaced approximately one and one-half inches from the lower end 58 of the casing 52. In order to assure that the upper end of the carbon section 70 is no closer to the cathodic casing 52 than its cylindrical wall, that part of the insulating arrangement 54 extending inwardly of the cathodic casing 52 is approximately one-half inch in length, such that the cooperation with the spacer 72, the upper end of the carbon section 70 is spaced approximately one inch from the upper end 58 of the cathodic casing 52.

Assuming that it is desired to fill the swimming pool 10, the manually operated valve 18 is turned to cause water to flow from the supply conduit 16 to the supply conduit 20, conduit 27 and into the conduit 32. Simultaneously, the contacts 46 are shorted by appropriate means and the timer mechanism 31 in the control system 38 is operated to cause the switch contacts 48 to close, thereby energizing the cell 26 by supplying the D.C. voltage of the source 37 to its anode 50 and cathode 52.

Considering now in greater detail the action of the sterilizing and purifying device 26, the water from the inlet conduit 24 enters the bottom of the cell 26 and passes upwardly along the silver section 64. By electrolytic action, some form of silver, possessing germicidal properties (hereafter called silver product or silver dispersion), is dispersed in the water adjacent to the silver section 64 and, since it is customary for water to have some sodium chloride, silver chloride and the like is also produced. Based on experimental work to date, it is believed that the silver dispersion comprises either silver ions or colloidal silver chloride, each of which, as has been well established, is an effective germicidal. In any event, the water passing upwardly by the silver section 64 contains a silver dispersion, silver chloride and, presumably, sodium chloride.

As the water passes upwardly past the copper section 66 some form of copper, possessing algaecidal properties (hereinafter called copper product or copper dispersion), is dispersed in the water by electrolytic action. Because of the presence of sodium chloride, copper chloride is also produced electrolytically. Based on experimental work to date, it is believed that the copper dispersion comprises either copper ions or colloidal copper chloride, each of which, as has been clearly established, is an effective algaecidal. Thus, the water passing upwardly by the copper section 66 is charged with a silver dispersion, silver chloride, a copper dispersion, copper chloride and sodium chloride.

As this water passes upwardly by the iron section 68, there is electrolytically produced ferrous chloride and ferrous ions which are oxidized to the ferric state. The ferric ions, in turn, coact with hydroxides to form ferric hydroxide which, as is well known, comprises a flocculant or coagulant that enmeshes non-organic particles, said flocculant also being referred to as a cleansing product.

As the water continues to move upwardly in the cell 26, it passes the carbon section 70, which comprises the upper end of the composite anode 50. It is believed that the silver chloride adjacent to the carbon section 70 is transformed into a silver dispersion having the germicidal properties described above. Similarly, it is believed that copper chloride adjacent the carbon section 70 is transformed into a copper dispersion possessing algaecidal properties similar to that described above. As a result, the percentage of silver chloride and copper chloride present in the water is substantially reduced and since the silver dispersion and copper dispersion are more effective germicidal and algaecidal agents than the silver chloride and copper chloride, the germicidal and algaecidal action of the cell is increased.

From the foregoing description, it will be appreciated that the water leaving the cell 26 and passing into the conduit 27 contains a silver dispersion, a copper dispersion, a ferric hydroxide coagulant, silver chloride, copper chloride, and sodium chloride. It has been observed that the best sterilizing and purification action occurs when the ratio of the copper dispersion to the silver dispersion is approximately 1 to 2. It is believed that this ratio contributes to maintaining the pH factor in the pool between 7 and 8.

As suggested above, the water containing the above described products passes from the conduit 27 and into the conduit 32. A relatively small percentage of the water enters the conduit 35 and by-passes the filter apparatus 34 while substantially all of the water enters the filter apparatus 34. Inasmuch as the ferric hydroxide coagulant is insoluble in water, it builds up on the upper screen 33 to enhance the filtering action of the apparatus 34. It has been determined that the silver dispersion and copper dispersion impregnate the coagulant to provide a concentrated sterilizing area in the filter apparatus 34. It has been observed that a significant amount of the silver dispersion and the copper dispersion is captured by the coagulant with the result that the water leaving the apparatus 34 is devoid of the silver germicidal, the copper germicidal and the non-organic particles which are removed from the water by the filter screen 33. The sterilized and purified water leaving the filter apparatus 34 mixes with the water flowing from the by-pass conduit 35, whereby the water entering the swimming pool 10 includes a relatively small percentage of silver dispersion, copper dispersion, and ferric hydroxide coagulant. By this arrangement, the silver dispersion and the copper dispersion are fed directly into the pool 10 to assure the presence in the pool of a satisfactory amount of residual germicidal product and residual algaecidal product.

When the swimming pool 10 is filled with water, the manually operable valve 18 is adjusted to block the flow of water from the supply conduit 16. Thereafter, the timer mechanisms 31 and 43 of control system 38 are adjusted to cause the periodic operation of the sterilizing and purifying device 26 during the period of recirculation of the pool water. It is customary in the swimming pool field to recirculate the water in the swimming pool through the water treatment system when the pool is in use. In some installations the water is continuously recirculated, i.e., for a twenty-four hour period each day. However, it is the general practice to recirculate the water through the water treatment system only during the daylight hours, for example from 6:00 a.m. through 9:00 p.m. Accordingly, the timer mechanism 31 of the control system 38 is set so that the contacts 44 are closed to effect the operation of the pump 40 continuously between 6:00 a.m. and 9:00 p.m. and, further, so that the contacts 46 are closed to condition the device 26 for operation under the control of the timer mechanism 43. The timer mechanism 43 is set so that the contacts 48 are closed and opened to cause the periodic energization and deenergization of the device 26 between 6:00 a.m. and 9:00 p.m. period; for example, the device 26 is energized for one minute and deenergized for eleven minutes. Of course between 9:00 p.m. and 6:00 a.m., for example, both the pump and the sterilizing and purifying device 26 are not energized.

When the device 26 is on during the 6:00 a.m. to 9:00 p.m. period, the device 26 operates as described above, i.e., the outside-induced current from the D.C. battery 37 electrolytically produces the germicidal product, algaecidal product, and cleansing product. However, during the off period, it is believed that the galvanic-induced current produces the germicidal product and the algaecidal product. Hence, even when the water is being circulated through the inoperative device 26, a silver dispersion and a copper dispersion is dispersed into the recirculating water. It will be appreciated that if, for any reason, the bacteria count or algaecidal count in the pool increases above a predetermined healthful level, the control system 38 can be adjusted to increase the on time and, conversely, decrease the off time of the device 26.

Considering now the second embodiment of the sterilizing and purifying device 26, attention is directed to FIG. 3. The FIG. 3 embodiment differs from the FIG. 2 embodiment in that the FIG. 3 embodiment includes a pair of electrolytic cells 100 and 102, in contrast to the FIG. 2 embodiment which includes only a single electrolytic cell. The cell 100 embodies a generally cylindrical cathodic casing 104 within which is suspended a composite anode 106, while the cell 102 embodies a generally cylindrical cathodic casing 108 within which is suspended a composite anode 110. The cells 100 and 102 are arranged in parallel and, consequently, each conducts approximately one-half of the water flowing through the conduits 24 and 27. Whereas the relative densities of the current passing between the sections 64, 66, 68 and 70 and the cathodic casing 52 of the FIG. 2 embodiment is determined by the relative size and location of the anode sections, the current densities of the composite anodes of the cells 100 and 102 are further controlled by separate D.C. voltage sources 112 and 114. By using variable voltage sources, the voltages supplied to the respective cells 100 and 102 are adjustable to change the relative current densities of the composite anodes 106 and 110 in accordance with the demands of the particular installation.

The cells 100 and 102 perform the identical function as the cell 26 and develop a product to destroy pathogenic organisms or bacteria, a product to destroy algae, and a cleansing product comprising a flocculent or coagulent to capture non-organic particles. However, inasmuch as the composite anodes 106 and 110 of the cells 100 and 102 are different, the germicidal product is produced in the cell 100, while the algaecidal product and the flocculent product are produced in the cell 102. Although the above products are produced separately in the cells 100 and 102, the water leaving the FIG. 3 embodiment contains the identical products as the water leaving the FIG. 2 embodiment and, consequently, the sterilizing and purifying functions of the two embodiments are the same.

Considering now the composite anodes 106 and 110 in greater detail, they are constructed in a manner similar to that of the composite anode 50. For example, the composite anode 106 comprises a silver section 120 connected to a carbon section 122 via a metallic rod 124 and spacer 126. The metallic rod 124 is connected to the casing 104 via one of the spacers 126 and an insulating arrangement 128, similar to the above-described spacer 72 and insulating arrangement 54. The silver section 120 and the carbon section 122 have the same general dimensions as the above-described silver section 64 and carbon section 70. Similarly, the casing 104 has the same general diameter as the casing 52 but, since the composite anode 106 is much shorter than the composite anode 50, the length of the casing 104 is correspondingly shorter than the casing 52. As shown, the upper end of the metallic rod 124 is connected via conductor 142 to the variable terminal of a D.C. voltage source 114 through contacts 158 of a pump timer mechanism 131 and contacts 164 of a device timer mechanism 143, while the casing 104 is suitably grounded.

The composite anode 110 includes a copper section 130, an iron section 132 and a carbon section 134 spaced apart and connected together by a metallic rod 136 and a plurality of spacers 138. Similar to the metallic rods 74 and 124, the metallic rod 136 is secured to the top of the casing 108 via one of the spacers 138 and a suitable insulating arrangement 140. The copper, iron, and carbon sections 130, 132 and 134 have the same general dimensions as the copper, iron and carbon sections 66, 68, and 70 described above. Similarly, the cathodic casing 108 has the same general diameter as the cathodic casing 52 but, since the composite anode 110 is shorter than the composite anode 50, the length of the casing 108 is shorter than the casing 52. As shown, the upper end of the metallic rod 136 is connected via conductor 144 to the variable terminal of a D.C. voltage source 112 through contacts 156 of the pump timer mechanism 131 and the contacts 162 of the timer mechanism 143, while the casing 108 is suitably grounded.

It will be appreciated from the description of the FIG. 2 embodiment that the cells 100 and 102 operate to electrolytically disperse into the water a product that possesses bacteria-destroying properties, a product that possesses algae-destroying properties, and a product that removes or cleanses non-organic particles or the like from the water. Specifically, the water entering the cell 100 passes upwardly along the silver section 120 which produces a silver dispersion and silver chloride. As the water containing the silver dispersion and the silver chloride passes by the carbon section 122, it is believed that the silver chloride adjacent to the carbon section 122 is transformed into a silver dispersion.

On the other hand, the water from the inlet conduit 24 enters the bottom of the cell 102 and passes upwardly along the copper section 130. The copper section, by electrolytic action, disperses a copper dispersion and copper chloride into the water. As the water passes upwardly by the iron section 132, ferric hydroxide coagulant is produced, as described above. As the water continues to move upwardly in the cell 102, it passes the carbon section 134. In a manner similar to that described above, it is believed that the copper chloride adjacent to the carbon section 134 is transformed into a copper dispersion.

Hence, the cell 100 produces a germicidal product, while the cell 102 produces an algaecidal product and a flocculent. Inasmuch as the water leaving the cells 100 and 102 is mixed in the conduit 27, the water leaving the FIG. 3 embodiment is substantially identical to the water leaving the FIG. 2 embodiment.

However, by employing the double cells 100 and 102 and their associated voltage supplies 112 and 114, the ratio of germicidal to algaecidal and coagulant can be readily adjusted without altering the physical dimensions and spacing of the sections 120, 122, 130, 132 and 134. In short, by using the FIG. 3 embodiment, the amount of germicidal and algaecidal can be independently changed to compensate specifically for undesirable bacteria and algae levels developing in the pool.

Of course, it should be understood that for particular installations having peculiar bacteria and algae problems, the FIG. 2 embodiment can be equally satisfactory by redesigning the configuration, size, and relative location of the anode sections. Thus, the composite anode of the FIG. 2 embodiment can be slightly modified as indicated above to achieve a predetermined performance in accordance with the demands of the particular installation.

In a modified form of the above described FIG. 2 and FIG. 3 embodiments, a zinc-copper alloy is substituted for the copper section of the composite anodes. By electrolytic action both a copper dispersion and a zinc dispersion are produced in the cells, instead of only a copper dispersion, as described above. It is believed at this time that zinc dispersion and copper dispersion are more effective algaecides in certain types of installations than only a copper dispersion. Irrespective of the presence of the zinc-copper alloy in the FIG. 2 and FIG. 3 embodiments, the cells also produce a germicidal and a coagulant as described above.

In a further modified form of the above-described FIG. 2 and FIG. 3 embodiments, a composite A.C. and D.C. voltage is applied to the anodes and cathodes of the above-described cells. Specifically, a composite voltage source is substituted for the D.C. source 37 in the FIG. 2 embodiment and a pair of composite voltage sources is substituted for the D.C. voltage sources 112 and 114 of the FIG. 3 embodiment. Each of the above-referred to composite voltage sources includes both an A.C. source comprising a standard 110–6 volt transformer and, further, a D.C. source which includes a standard 110–6 volt transformer and a full wave rectifier arrangement.

In order to control the magnitude of the A.C. and D.C. voltages, a suitable rheostat is embodied in each of the A.C. and D.C. voltage sources. By this arrangement, the ratio of the A.C. current to the D.C. current flowing between the anode and cathode of the FIG. 2 or FIG. 3 embodiments can be accurately varied and controlled. In any event, it has been determined that a 3:1 ratio of D.C. current to A.C. current maintains a composite anode in a clean condition, i.e., free from scale or chloride accumulations. At this ratio, the germicidal and algaecidal action of the FIG. 2 and FIG. 3 embodiments is not impaired.

While several embodiments described herein are at present considered to be preferred, it is understood that various modifications and improvements may be made therein and it is intended to cover in the appended claims all such modifications and improvements as fall within the true spirit and scope of the invention.

What is desired to be claimed and secured by Letters Patent of the United States is:

1. Apparatus for sterilizing a liquid comprising metallic casing means, inlet means in said casing means, outlet means in said casing means to provide a flow path through said casing means, a composite electrode arrangement located in said casing means in said flow path and including a silver section, a copper section, a metallic section, and a carbon section, means including said silver section for defining a first electrolytic zone for dispersing a germicidal product in the liquid flowing in said path, means including said copper section for defining a second electrolytic zone for dispersing an algaecidal product in the liquid flowing in said path, means including said metallic section for defining a third electrolytic zone for dispersing a coagulant product for capturing non-organic particles in the liquid flowing in said path, and means including said carbon section for defining a fourth electrolytic zone that coacts with products of said first and second electrolytic zone for dispersing germicidal and algaecidal products in the liquid flowing in said path, said fourth electrolytic zone being located downstream of said first and second electrolytic zones.

2. Apparatus for sterilizing a liquid comprising metallic casing means, inlet means in said casing means, outlet means in said casing means to provide a flow path through said casing means, a composite electrode arrangement located in said casing means in said flow path and including a silver section, a copper section, and a carbon section, means including said silver section for defining a first electrolytic zone for dispersing a germicidal product in the liquid flowing in said path, means including said copper section for defining a second electrolytic zone for dispersing algaecidal product in the liquid flowing in said path, and means including said carbon section for defining a third electrolytic zone that coacts with products of said first and second electrolytic zone for dispersing germicidal and algaecidal products in the liquid flowing in said path, said third electrolytic zone being located downstream of said first and second electrolytic zones.

3. Apparatus for sterilizing a liquid comprising metallic casing means, inlet means in said casing means, outlet means in said casing means to provide a flow path through said casing means, a composite electrode arrangement located in said casing means in said flow path and including a silver section, a copper section, and a carbon section, means including said silver section and said casing means for defining a first electrolytic zone for dispersing a germicidal product in the liquid flowing in said path, means including said copper section and said casing means for defining a second electrolytic zone for dispersing algaecidal product in the liquid flowing in said path, and means including said carbon section and said casing means for defining a third electrolytic zone that coacts with products of said first and second electrolytic zone for dispersing germicidal and algaecidal products in the liquid flowing in said path, said third electrolytic zone being located downstream of said first and second electrolytic zones.

References Cited in the file of this patent

UNITED STATES PATENTS

| | | |
|---|---|---|
| 398,101 | Webster | Feb. 19, 1889 |
| 937,210 | Harris | Oct. 19, 1909 |
| 1,473,331 | Bechhold | Nov. 6, 1923 |
| 2,008,131 | Dieck | July 16, 1935 |
| 2,036,949 | Meinzer | Apr. 7, 1936 |
| 2,046,467 | Krause | July 7, 1936 |
| 2,344,548 | Goetz | Mar. 21, 1944 |
| 2,658,033 | Ferris | Nov. 3, 1953 |
| 2,928,778 | Heathfield et al. | Mar. 15, 1960 |
| 3,010,886 | Chappel | Nov. 28, 1961 |

FOREIGN PATENTS

| | | |
|---|---|---|
| 662,625 | Great Britain | Dec. 5, 1951 |